United States Patent [19]
Thomson et al.

[11] Patent Number: 5,815,250
[45] Date of Patent: Sep. 29, 1998

[54] DOUBLET PULSE COHERENT LASER RADAR FOR PRECISION RANGE AND VELOCITY MEASUREMENTS

[75] Inventors: J. Alex Thomson, Santa Fe, N. Mex.; Stephen M. Hannon, Arvada; Sammy W. Henderson, Boulder, both of Colo.

[73] Assignee: Coherent Technologies, Inc., Boulder, Colo.

[21] Appl. No.: 863,839

[22] Filed: May 27, 1997

[51] Int. Cl.[6] ............................................. G01C 3/08
[52] U.S. Cl. ............................................ 356/5.01; 356/28
[58] Field of Search .................................. 356/5.01, 5.1, 356/5.14, 28, 28.5

[56] References Cited

U.S. PATENT DOCUMENTS

| | | | |
|---|---|---|---|
| 5,044,744 | 9/1991 | Ogawa et al. | 356/5 |
| 5,155,542 | 10/1992 | Rampolla et al. | 356/5 |
| 5,237,331 | 8/1993 | Henderson et al. | 342/54 |
| 5,247,303 | 9/1993 | Cornelius et al. | 342/26 |
| 5,521,930 | 5/1996 | Suni et al. | 372/13 |

OTHER PUBLICATIONS

Zrnic, Dusan S., "Estimation of Spectral Moments for Weather Echoes", *IEEE Transactions on Geoscience Electronics*, Oct. 1979, vol. GE–17, pp. 113–128.

*Primary Examiner*—Mark Hellner
*Attorney, Agent, or Firm*—James R. Young

[57] ABSTRACT

In a laser radar (lidar) system, a Doublet Pulse is generated by injection-seeded aborted cavity dumping of a solid-state laser. The doublet pulse provides coherent Doppler lidar systems a substantial time bandwidth product (TB) with a very modest processing requirement. The waveform format comprises a pair of pulselets, each of duration $\tau$, separated by T seconds. The range resolution is governed by the pulselet duration $\tau$, while the velocity precision is governed by one over the pulselet separation, T. Ambiguities in the velocity measurement arise as a result of the periodic structure of the waveform and occur every $\lambda/2T$ m/sec, where $\lambda$ is the operating wavelength. These ambiguities are removed by conventional de-aliasing algorithms as well as through the generation and processing of higher order pulse waveforms.

32 Claims, 6 Drawing Sheets

DOUBLET PULSE COHERENT LASER RADAR FOR PRECISION RANGE AND VELOCITY MEASUREMENTS

FIELD OF THE INVENTION

This invention relates to distance and velocity measuring systems and more particularly to laser radar (lidar) systems. Even more particularly, the invention relates to using a doublet pulse to measure distance and velocity.

BACKGROUND OF THE INVENTION

High time bandwidth product waveforms can be used in lidar (laser radar) and radar systems to achieve simultaneous precise range and velocity measurements. The time bandwidth product (TB) is the product of the pulse duration by the pulse bandwidth. Similarly, the TB can be expressed as the product of the range resolution by the frequency resolution of the waveform. For high TB values, the processing requirements for lidar systems can become significant, often requiring expensive surface acoustic wave (SAW) processing architectures or large number of vector digital signal processing (DSP) chips.

Pulse pair waveforms, called Doublet Pulse waveforms, which are limiting cases of the general pulse train, are routinely used in Doppler radar for both hard target and aerosol target applications. The pulse pair and poly-pulse-pair transmit formats have been applied to microwave radar for radial velocity and spectral width probing of weather echoes, as described by Campbell and Strauch, "Meteorological Doppler Radar with Double Pulse Transmission," Proc. 17th Conference on Radar Meteorology, pp. 42–44 (1975) and Zrnic, D. S., "Estimation of spectral moments for weather echoes," IEEE Trans. Geosci. Electron. GE-17, 113 (1979).

In the past, extension of the Doublet Pulse to optical wavelengths was not done for several reasons. First, it was difficult to efficiently produce the Doublet Pulse waveform optically. Second, unlike radar, the frequency and phase of the transmitted waveform was difficult to keep constant from one pulselet to the next.

Thus there is a need in the art for a lidar system that uses the Doublet Pulse method to achieve simultaneous high range and velocity precision. A further need is for such a system that removes the effects of fluctuations in frequency and phase of the transmitted waveform.

SUMMARY OF THE INVENTION

It is an aspect of the present invention to apply the Doublet Pulse format to coherent lidar range and velocity measurements.

It is another aspect of the invention to generate the Doublet Pulse through cavity dumping of the laser.

Another aspect of the invention is to provide a numerically efficient means of processing the Doublet Pulse return signal.

A still further aspect of the invention is to transmit orthogonal polarization states, or different frequency offsets, for the individual pulselets to eliminate interference from ambiguous ranges for high spatial resolution atmospheric velocity measurements.

The present invention makes two key advances. First, the Doublet pulse is generated by injection-seeded aborted cavity dumping of a solid-state laser. Second, a novel processing technique is used to remove the effects of fluctuations in frequency and phase of the transmitted waveforms.

The present invention extends the pulse pair waveform to optical wavelengths. The doublet pulse provides coherent Doppler lidar systems a substantial time bandwidth product (TB) with a very modest processing requirement. The waveform format comprises a pair of pulselets, each of duration $\tau$, separated by T seconds. The range resolution is governed by the pulselet duration $\tau$, while the velocity precision is governed by one over the pulselet separation, T.

Ambiguities in the velocity measurement arise as a result of the periodic structure of the waveform and occur every $\lambda/2T$ m/sec, where $\lambda$ is the operating wavelength. These ambiguities are removed by conventional de-aliasing algorithms as well as through the generation and processing of higher-order waveforms, such as triplet or quadruplet pulses.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

The Doublet Pulse waveform can be applied to coherent lidar systems that perform simultaneous range and Doppler processing/imaging. Range resolutions of 1 foot to a few meters with velocity precision of 0.1 mm/sec to 1 m/sec can be readily achieved. The Doublet Pulse coherent lidar can be applied to both aerosol (distributed) and hard targets.

The following sections describe the manner in which the Doublet Pulse can be generated with a laser, and the manner in which the Doublet Pulse return signal can be efficiently processed to produce range and velocity measurements.

General Doublet Pulse Laser Radar and Processing

Figure 1:
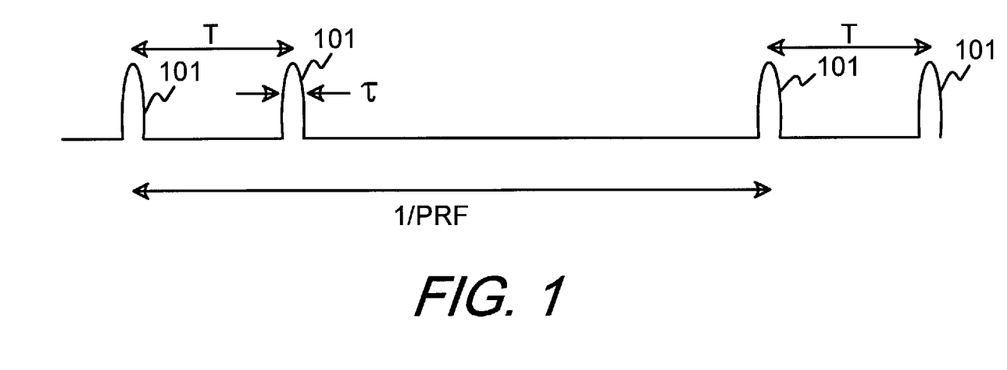
FIG. 1 Shows the general Doublet Pulse format.

FIG. 1 shows the Doublet Pulse format. Referring to FIG. 1, the duration of each pulselet 101 is represented by $\tau$, and the separation time between the pulselets 101 is represented by T. The basic principle behind the Doublet Pulse format is that the target velocity is measured by estimating the phase difference of the carriers in the two detected pulselets, which are separated by the pulse separation time, T. This phase difference is directly related to the distance the target travels, relative to a wavelength, during the pulselet separation distance. Because the phase difference is ambiguous over a $2\pi$ interval, the target velocity will also be ambiguous over a $\lambda/2T$ interval. Since typical lidar Doublet Pulse pairs have random phases and different carrier frequencies, the lidar Doublet Pulse processing method, described below, is more involved than the simple radar pulse-pair algorithm described by Zrnic, Id.

Figure 2A:
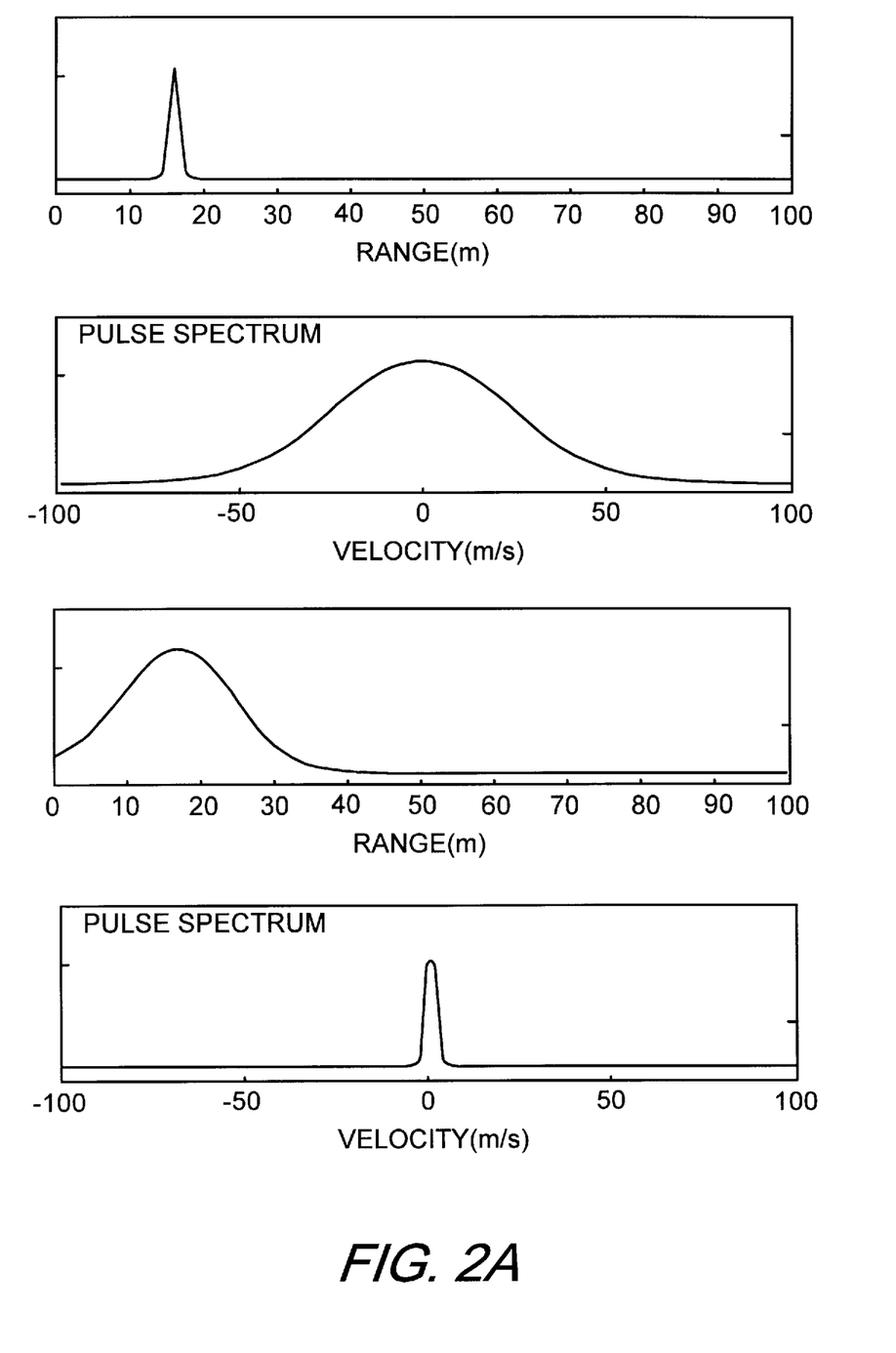
FIG. 2 Shows a Multi-panel display of transform-limited and doublet-pulse transmit waveforms and corresponding spectra.
Figure 2B:
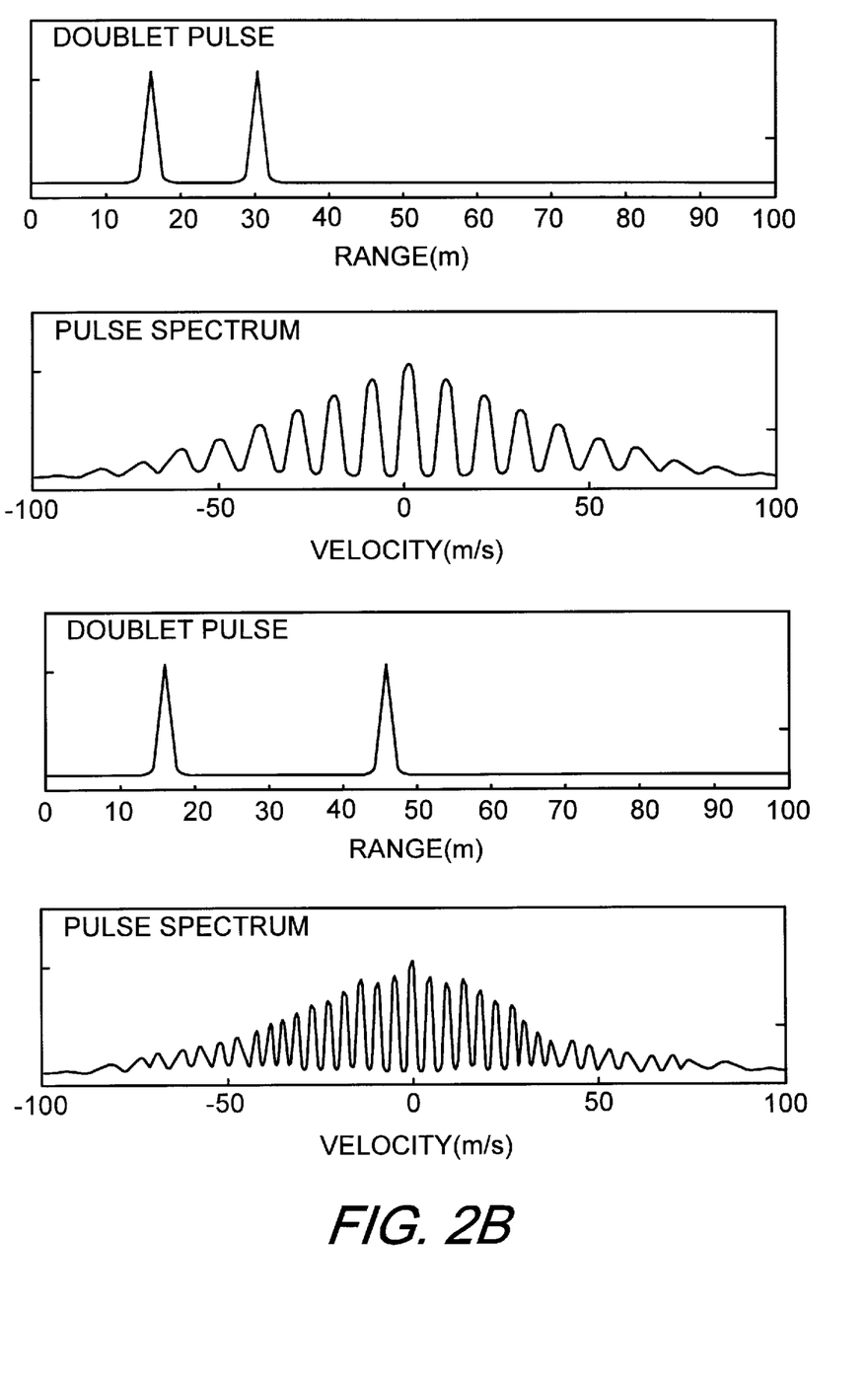

FIG. 2 shows waveforms of transform-limited pulses and Doublet Pulses. Referring to FIG. 2, the left panels show transform-limited pulses and their spectra for 10 nsec (2 m) and 100 nsec (20 m) pulsewidths. The right panels show doublet pulse waveforms and their spectra for 10 nsec pulselets. The upper right two panels show a 100 nsec pulselet separation, while the lower right two panels show 200 nsec pulselet separation.

Figure 3:
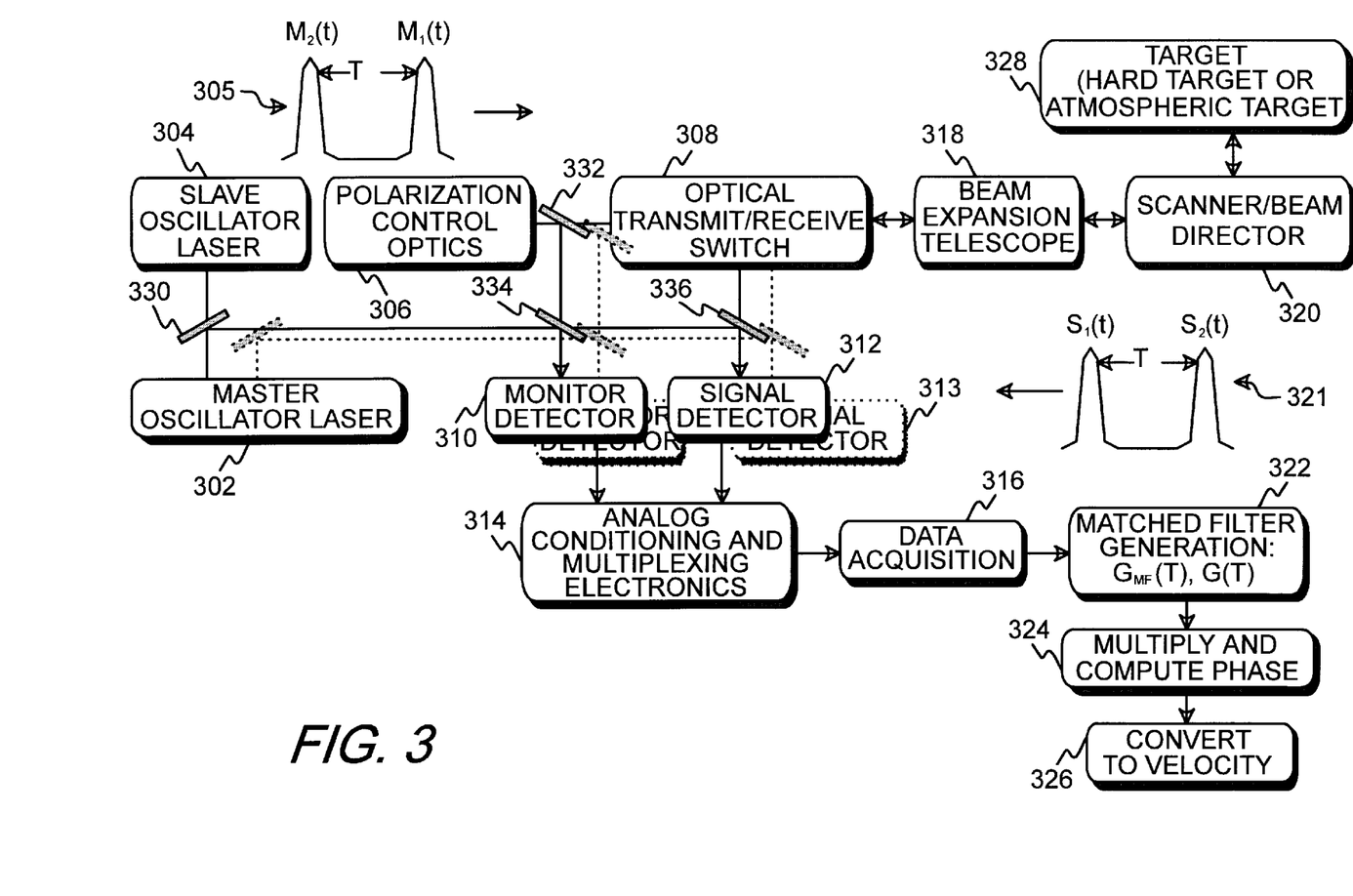
FIG. 3 Shows a block diagram of a general Doublet Pulse Coherent Laser Radar System.

FIG. 3 shows a simplified block diagram of a doublet pulse coherent laser radar. Referring to FIG. 3, the master oscillator 302 produces a pair of pulselets every 1/PRF seconds. Dual polarization states, or offset frequencies, may be utilized such that the first pulselet polarization state, or frequency offset, is orthogonal to the second pulselet polarization state, or separated in frequency from the second pulselet, which is useful for atmospheric targets. The pulselets are spatially expanded by a transmit/receive telescope 318 and are directed out to the target 328, which is either a hard target or an atmospheric target. A portion of the radiation scattered off of the target is collected by the telescope 318 and directed to one or two signal photodetectors 312 and 313. The second signal detector 313 is used in a dual polarization configuration.

A few milliwatts of local oscillator light are extracted from the master oscillator 302 by beam splitter 336 and are combined or mixed with the return signal light on the surface of the signal photodetector(s) 312, 313. This heterodyne detection process provides significant signal gain such that the dominant noise mechanism is local oscillator shot noise, and quantum-limited detection is achieved. A small fraction of the transmit pulselets are split off prior to transmission by beam splitter 334 and fed to the monitor detector 310, where heterodyne detection is also performed. The monitor signals are used to perform the correction for frequency and phase jitter between pulselets.

The difficulty with implementing the doublet pulse in most solid-state eyesafe transmitters, with wavelengths between 1.5 and 5 $\mu$m, is that while sufficiently short pulselets can be generated, the frequency and phase offset between the two pulselets is not constant. The present invention uses a processing technique, described below, to remove the effects of fluctuations in frequency and phase of the transmitted waveforms. The basic principle behind the doublet pulse processing is that the target velocity is measured by estimating the phase difference of the carriers in the two detected pulselets, which are separated by the pulse separation time, T. This phase difference is directly related to the change in relative distance between the target and lidar platform, relative to a wavelength, during the pulselet separation time.

Range processing is performed through log-law linear law or square-law envelope detection of the individual pulselets followed by peak detection. The range is estimated from the time delay between the peak of the outgoing pulse and the peak of the envelope detector output. The range resolution will be $c\tau/2$, where c is the speed of light and $\tau$ is the pulselet width. For hard target applications, range ambiguities do not pose a significant problem, since the range spread of the target will typically be less than cT/2. For aerosol (distributed) target applications, the pulselet separation is limited to a few hundred nanoseconds in order to maintain coherence between the two pulselets. Also, indistinguishable returns from both pulses can occur when the range depth of the target is larger than cT/2. This latter ambiguity is not of significant concern for hard targets and separations of order 1 $\mu$sec, which represents a 150 meter range ambiguity.

For velocity processing in a laser radar application, the transmitted waveform consists of two short-duration pulselets separated by T with potentially unique carrier frequencies, pulse envelope functions and phase offsets. The effects of these unique phases and frequencies can be mitigated by sampling the frequency and phase of the transmitted waveform. This monitor signal serves as a reference for the detected waveform. The two transmit monitor pulselets are used to compute a transmit correlation or phase map, using conjugate multiplication and integration. Likewise, the return signals for the two pulselets are correlated to generate a return phase map. The radial velocity is then computed from the conjugate product of these matched filter and signal correlation values. Specifically, the phase of this complex number is directly proportional to the radial velocity. This method permits very efficient processing of the high time bandwidth product waveform.

The system defines the two backscattered pulselet waveforms $S_1(t)$ and $S_2(t)$ 321 and their respective monitor pulselets $M_1(t)$ and $M_2(t)$ 305. A matched filter generator 322 generates a single matched filter by correlating the two monitor pulselets 305. A similar correlation value is generated for the two return signals 321. The radial velocity is then computed from the conjugate product of the matched filter and signal correlation values. The mathematical formalism is illustrated below, with $\xi_1$ and $\xi_2$ representing the transmission and target scattering functions.

$M_1(t)$=first pulselet monitor $M_2(t)$=second pulselet monitor $G_{MF}(T)=\int M_1(t)M_2^*(t+T)dt$=matched filter correlation (phase map for V=0)

$S_1(t)=\xi_1 M_1(t-2R/c)\exp(j2kVt)$=second return signlet $S_2(t)=\xi_2 M_2(t-2R/c)\exp(j2kVt)$=second return signlet $G(T)=\int S_1(t)S_2^*(t+T)dt$=return signal correlation (return phase map)

$V_{radial}=\lambda \arg[G_{MF}(T)G^*(T)]/2kT$

The processing method described above is extremely efficient given that the time-bandwidth (TB) product can be as high as 10,000. Doublet pulse PRFs of 1–10 kHz can be readily accommodated in real-time by a modest-power Digital Signal Processor.

Processing of the higher-order pulselets involves computation of the correlation functions (monitor and return signal) at multiple lags or time delays. For example, the time delays are $T_1$ and $T_1+T_2$ for the triplet pulse. There are several ways to utilize the monitor pulse samples to process the return data. As one example, the monitor samples for the pulselets can be used to generate a transmit multiple-lag phase map, as before, or can be conjugate-multiplied against their respective transmit pulselets. For the second and all subsequent pulselets, the pulselet signal return phase delay, relative to its monitor signal, is altered by increasing or decreasing it by an amount defined by the time difference (lag) between the first pulselet and the pulselet being altered, and a target velocity that is hypothesized (predicted) to be correct. That is, $\Delta T*(4\pi/\lambda)*$hypothesized velocity, wherein the sign of the hypothesized velocity determines whether the phase delay is increased or decreased. This is done for each hypothesized velocity to effectively create a two-dimensional array having phase maps for the pulses as rows, and having hypothesized velocities as columns, wherein each combination of phase map and hypothesized velocity creates a phase-velocity value. A likelihood function is generated by accumulating, over all pulselets (or lags), the square of the differences between each pulselet return signal phase delay and the first pulselet's return signal phase delay, modified for each hypothesized target velocity, thus effectively collapsing the array to a single row, creating an accumulated phase error value for each hypothesized velocity. A minimization of this mean square accumulated phase error is derived as a function of the hypothesized velocities, and the most likely velocity is that velocity that produces the minimum phase error.

Doublet Pulse Generation

There are several means of generating the doublet pulse waveform with a laser. The primary method used in the present invention is aborted Q-switching of the laser cavity. An acousto-optic modulator (AOM) and an electro-optic modulator (EOM) are used in combination. The EOM is closed during pumping and pulse build-up, and the laser is Q-switched with the AOM. Fast detector and thresholding electronics are then used to detect the circulating laser power. When the desired power level is reached, the EO switch is rapidly opened to dump the cavity, producing a pulse a few nanoseconds in duration, dependent upon the cavity length. Because the cavity dumping occurs before the Q-switching process has depleted the entire population inversion, the process can be repeated after a variable delay, thereby producing the second pulselet.

It is possible to produce triple or higher-order pulse trains as well. A triple pulse or a quadruplet pulse, or even higher order pulses, can be utilized to reduce or eliminate velocity ambiguities directly. For example, a triplet pulse waveform will generate two delays, $T_1$ and $T_2$, between the three pulselets. Rather than having an ambiguity interval of $\lambda/2\, T_1$ or $\lambda/2\, T_2$, the velocity ambiguity interval is $\lambda/2|T_1-T_2|$. Generation of the higher-order waveforms requires repetitive, aborted Q-switching of the transmit laser cavity, in the same manner as described above.

An alternate means of generating doublet pulses is sequential Q-switching. With this method, the laser is simply Q-switched twice, provided that the first pulselet does not extract the entire population inversion. Rather than drive the Q-switch loss down to zero on the first pulse, the loss is reduced from its hold-off value to an intermediate state.

Figure 4:
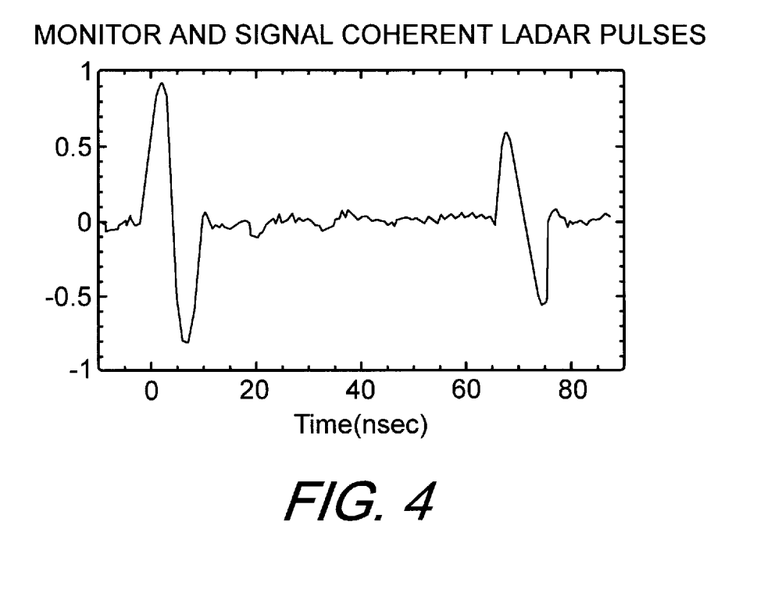
FIG. 4 Shows a sample heterodyne signal with a single-frequency cavity-dumped transmitted pulselet and return signal from short-range target.
Figure 5:
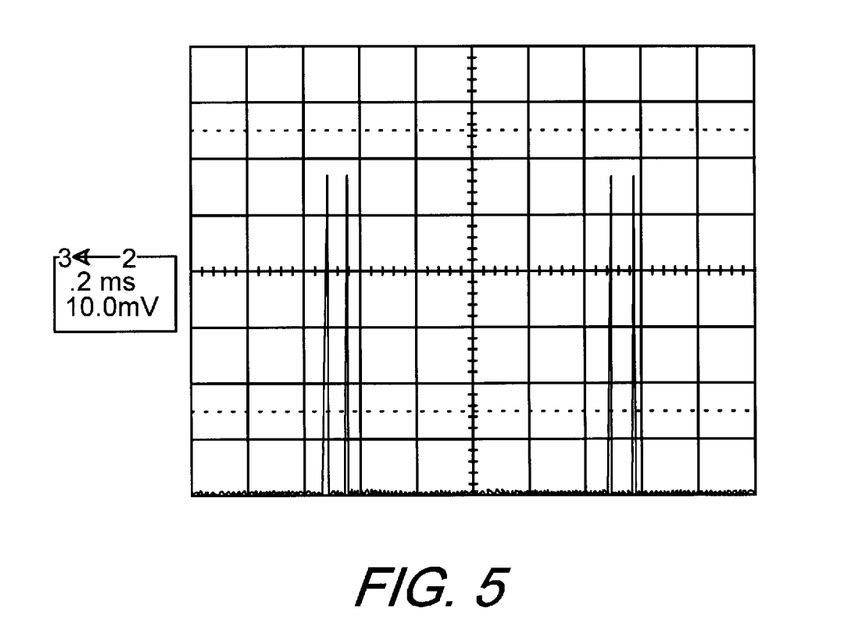
FIG. 5 Shows a sample pair of doublet pulses, each with 80 $\mu$sec pulselet separation and inter-pulse-pair time of 1 msec (1 kHz PRF)

In a first embodiment of doublet pulse generation within the present invention, a side-pumped, higher energy Tm:YAG 2 $\mu$m laser is used. In a second embodiment, an end-pumped Tm:YAG 2 $\mu$m laser, capable of generating 0.5–1 W of output power is used. A LiNbO$_3$ Pockels' cell is used for the cavity dumping. The cavity-dumped pulses have been measured at up to several hundred microjoules and were nominally 7 ns FWHM in duration, coinciding with the round-trip cavity propagation time. A single-frequency 2 $\mu$m CW laser was used to injection seed the pulsed laser. An example of a seeded 7 nsec pulselet heterodyne signal and its return echo from a nearby target are shown in FIG. 4. A demonstration of the doublet pulse generation is shown in FIG. 5. Here, the cavity-dumped pulselets are spaced approximately 80 $\mu$sec apart with a waveform PRF of 1 kHz.

Figure 6:
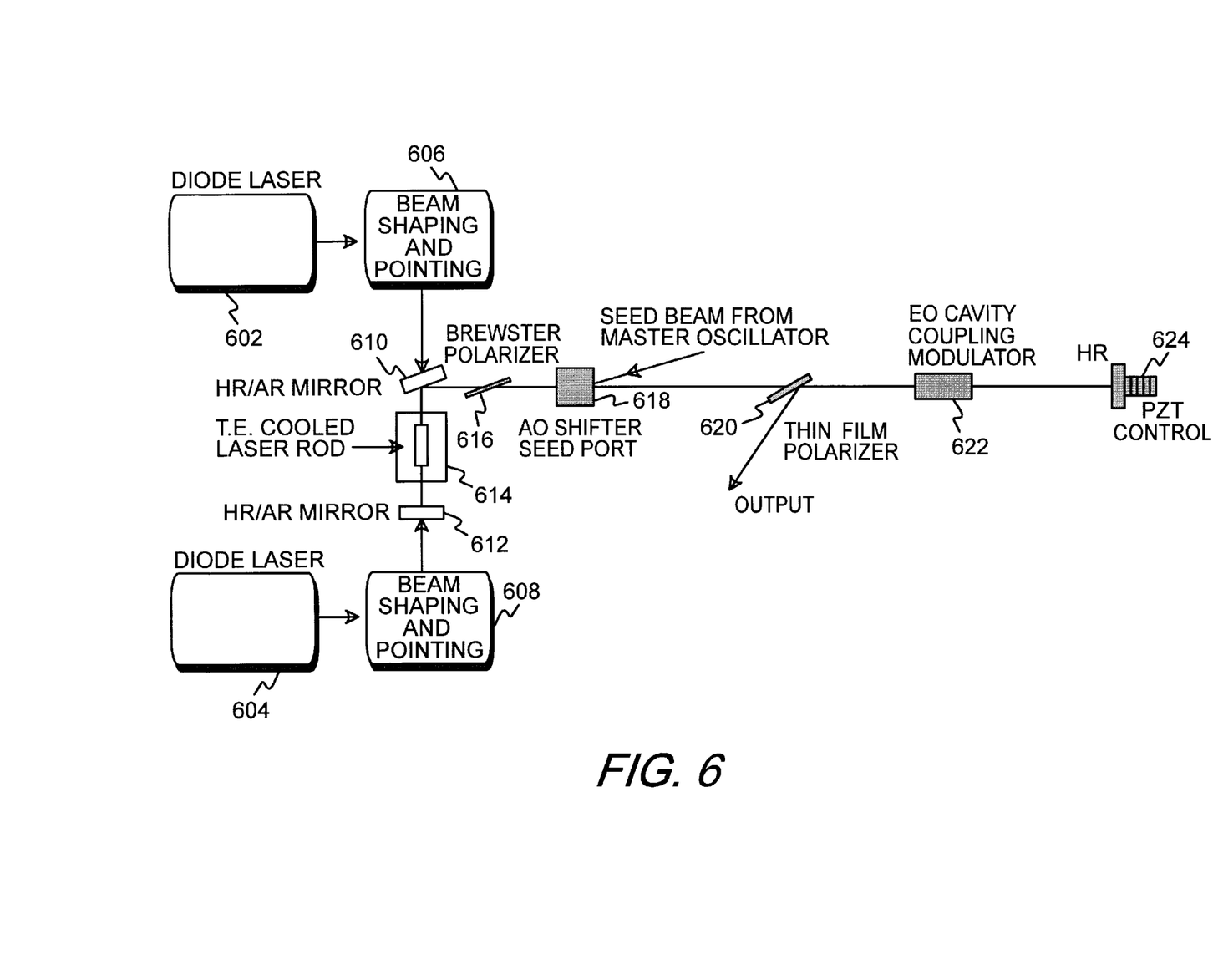
FIG. 6 Shows a block diagram of a baseline slave oscillator laser design for Doublet Pulse coherent laser radar.

FIG. 6 shows the baseline Doublet Pulse slave oscillator laser layout. The laser cavity contains two end mirrors, one mounted to a piezo-electric translator (PZT) 624 for control of the cavity length during injection seeding. In addition to the laser crystal and a Brewster plate 616 for polarization control, the general cavity also contains an acousto-optic Q-switch 618 and a polarizer/electro-optic modulator 622 acting as the controllable switch. The AO Q-switch 618 is used both for Q-switching and injection-seeding. Injection seeding of the laser using the first diffraction order of the AO device is a technique that has been previously described in U.S. Pat. No. 5,521,930.

For shorter pulselet separations, a simple white-cell delay line can be used to generate a time-delayed replica of the initial pulselet (or in the case of low pulse energy, a fiber delay line can be used). By routing the delayed replica through a polarizer and quarter wave plate or via electro-optic methods, orthogonal polarization states can be achieved for the two pulselets, thereby eliminating range ambiguities for aerosol targets that do not significantly de-polarize the incident radiation.

In the dual polarization state embodiment, a simple delay line is utilized to generate the two pulselets from a slave oscillator that transmits a single cavity dumped pulse at the waveform PRF. The base pulselet is linearly polarized and it is split between two paths. In the shortest path, the pulselet passes through two polarizers and then out through a quarter wave plate, through the remainder of transmit/receive optical switch and telescope into the atmosphere. In the longer path, the pulselet is reflected off of the first polarizer and into a path delay optical train that may be 100–200 nsec in duration (100–200 feet long, path-folded numerous times). This delayed pulselet then reflects off of another polarizer onto the same optical axis utilized by the first pulselet. This second pulselet's polarization is now rotated 90 degrees from that of the first pulselet. This pulselet then passes out through a quarter wave plate and telescope into the atmosphere as described above. The return radiation is split into two polarization-dependent channels and the local oscillator light from the single master oscillator is polarization-matched prior to mixing with the two return channels on a photodetector.

Advantages over Prior Art

The Doublet Pulse coherent lidar is an optical realization of the well-known pulse-pair waveform/processing Doppler radar architecture described by Zrnic, Id. Due to the much smaller target coherence times and the much larger Doppler shifts occurring for a given velocity, however, optical radars (lidars) have heretofore been limited to intra-pulse sampling to estimate Doppler velocity. On the other hand, microwave radars have relied on inter-pulse sampling and the transmission of pulses separated by many hundreds of microseconds to milliseconds to estimate velocity. The present invention of simultaneous range/velocity measurement permits application of the radar pulse-pair technique at optical wavelengths provided the pulselet separation time is smaller than the target coherence time.

The type of velocity processing described above for the Doublet Pulse is extremely efficient when compared with other high TB processing approaches which rely on spectral-domain processing. For example, another approach uses a wideband fiber lidar concept in which a Gaussian pulse envelope is transmitted with an arbitrary frequency character. Each transmitted pulse differs from the next transmitted pulse such that a transmit pulse monitor is needed. The matched filtering requirements burden the signal processor significantly in this approach. As another example, controlled chirped waveforms can be generated with a laser. In such circumstances, a surface acousto-optic wave (SAW) processor can be used to demodulate the return waveform and provide sufficient range/Doppler resolution. However, the receiver cost can be significant in this last approach.

For atmospheric (distributed) targets, the polarization isolation, or frequency offset, extension to the Doublet Pulse transmitter prevents range overlap between the two pulselets from significantly complicating the signal processing and reducing the overall performance. As long the depolarization on scattering is small, the polarization difference will allow the two pulse returns to be detected separately even when they overlap in time.

What is claimed is:

1. A system for determining a range and velocity of a distant object, the system comprising:
   a laser for creating a doublet pulse waveform of coherent light, wherein the doublet pulse waveform comprises two pulses;
   at least one optical element connected to the laser for directing the double pulse waveform toward the distant object and for receiving a reflected doublet pulse waveform returned from the distant object;
   a detector circuit connected to the optical element for detecting the reflected doublet pulse waveform;
   a time delay measuring circuit connected to the detector circuit for measuring a time delay between the doublet pulse waveform and the reflected doublet pulse waveform wherein the time delay defines the range of the distant object;
   a phase measuring circuit for measuring a phase difference between first and second pulses in the reflected doublet pulse waveform, and for determining the velocity of the distant object from the phase difference.

2. The system of claim 1 wherein the laser further comprises:
   an acousto-optic modulator for q-switching the laser; and
   an electro-optic modulator for detecting power within the laser and for dumping a cavity within the laser to produce a first pulse of the doublet pulse waveform upon reaching a predetermined power level, and for dumping the cavity a second time after a predetermined delay to produce the second pulse of the doublet pulse waveform.

3. The system of claim 1 wherein the laser further comprises:
   an acousto-optic modulator for q-switching the laser twice to create the first and second pulses of the doublet pulse waveform.

4. The system of claim 1 further comprising a second laser connected to injection seed the laser.

5. The system of claim 1 wherein the laser further comprises means for creating more than two pulses.

6. The system of claim 5 wherein the means for creating the more than two pulses comprises repetitive q-switching.

7. The system of claim 5 wherein the phase measuring circuit further comprises:
   means for determining a plurality of phase differences, one difference between a monitor signal of each of the more than two pulses created, and a return signal corresponding to each of the more than two pulses created;
   means for accumulating a plurality of phase errors between a phase difference of a first of the more that two pulses created, and a phase difference of each of the more that two pulses created after the first of the more than two pulses created, wherein each phase difference is modified by a time difference between the transmission of the pulse and one of a set of predicted velocities, to create a plurality of phase error values, one phase error value for each combination of a phase difference of one of the more that two pulses and one of the set of predicted velocities;
   means for accumulating the phase error values for each one of the set of predicted velocities to create accumulated phase error values; and
   means for selecting the velocity as the predicted velocity of the accumulated phase error value that is a minimum of the phase error values.

8. The system of claim 7 wherein the means for determining a plurality of phase differences further comprises means for determining the phase difference between a monitor signal of each pulselet after the first of the more than two pulselets created, and a return signal corresponding to each pulselet after the first of the more than two pulselets created, by altering the phase difference by the time difference between the pulselet being altered and the first pulselet and further altering the phase difference by a hypothesized target velocity.

9. The system of claim 1 wherein the laser further comprises means for creating a second of the two pulses having a polarization state orthogonal to a polarization state of a first of the two pulses.

10. The system of claim 9 wherein the means for creating the second of the two pulses having a polarization state orthogonal to a polarization state of a first of the two pulses comprises:
    a first polarizer that splits a pulse created by the laser into first and second pulses and directs the first pulse into a first optical path and directs the second into a second optical path;
    an optical delay line that delays the first pulse in the first optical path a predetermined amount of time;
    a second polarizer that combines the first pulse from the first optical path with the second pulse from the second optical path at a location beyond the optical delay line to create the double pulse waveform wherein the first and second pulselets have orthogonal polarization.

11. the system of claim 1 wherein the phase measuring circuit further comprises:
    a transmit correlation circuit for creating a transmit phase map of the transmitted pulses;
    a receive correlation circuit for creating a receive phase map of the received pulses; and
    a filter circuit for creating a conjugate product of the transmit phase map and the receive phase map to determine the velocity.

12. A system for determining a range and velocity of a distant object, the system comprising:
    a laser for creating a doublet pulse waveform of coherent light, wherein the doublet pulse waveform comprises two pulses;
    at least one optical element connected to the laser for directing the double pulse waveform toward the distant object and for receiving a reflected doublet pulse waveform returned from the distant object;

a detector circuit connected to the optical element for detecting the reflected doublet pulse waveform;

a time delay measuring circuit connected to the detector circuit for measuring a time delay between the doublet pulse waveform and the reflected doublet pulse waveform wherein the time delay defines the range of the distant object;

a phase measuring circuit for measuring a phase difference between first and second pulses in the reflected doublet pulse waveform, and for determining the velocity of the distant object from the phase difference, the phase measuring circuit comprising a transmit correlation circuit for creating a transmit phase map of the transmitted pulses, a receive correlation circuit for creating a receive phase map of the received pulses, and a filter circuit for creating a conjugate product of the transmit phase map and the receive phase map to determine the velocity.

13. The system of claim 12 wherein the laser further comprises:

an acousto-optic modulator for q-switching the laser; and an electro-optic modulator for detecting power within the laser and for dumping a cavity within the laser to produce a first pulse of the doublet pulse waveform upon reaching a predetermined power level, and for dumping the cavity a second time after a predetermined delay to produce the second pulse of the doublet pulse waveform.

14. The system of claim 12 wherein the laser further comprises:

an acousto-optic modulator for q-switching the laser twice to create the first and second pulses of the doublet pulse waveform.

15. The system of claim 12 further comprising a second laser connected to injection seed the laser.

16. The system of claim 12 wherein the laser further comprises means for creating more than two pulses.

17. The system of claim 16 wherein the means for creating the more than two pulses comprises repetitive q-switching means.

18. The system of claim 16 wherein the phase measuring circuit further comprises:

means for determining a plurality of phase differences, one difference between a monitor signal of each of the more than two pulses created, and a return signal corresponding to each of the more than two pulses created;

means for accumulating a plurality of phase errors between a phase difference of a first of the more that two pulses created, and a phase difference of each of the more that two pulses created after the first of the more than two pulses created, wherein each phase difference is modified by a time difference between the transmission of the pulse and one of a set of predicted velocities, to create a plurality of phase error values, one phase error value for each combination of a phase difference of one of the more that two pulses and one of the set of predicted velocities;

means for accumulating the phase error values for each one of the set of predicted velocities to create accumulated phase error values; and means for selecting the velocity as the predicted velocity of the accumulated phase error value that is a minimum of the phase error values.

19. The system of claim 18 wherein the means for determining a plurality of phase differences further comprises means for determining the phase difference between a monitor signal of each pulselet after the first of the more than two pulselets created, and a return signal corresponding to each pulselet after the first of the more than two pulselets created, by altering the phase difference by the time difference between the pulselet being altered and the first pulselet and further altering the phase difference by a hypothesized target velocity.

20. The system of claim 12 wherein the laser further comprises means for creating a second of the two pulses having a polarization state orthogonal to a polarization state of a first of the two pulses.

21. The system of claim 20 wherein the means for creating the second of the two pulses having a polarization state orthogonal to a polarization state of a first of the two pulses comprises:

a first polarizer that splits a pulse created by the laser to create first and second pulses directs the first pulse into a first optical path and directs the second into a second optical path;

an optical delay line that delays the first pulse in the first optical path a predetermined amount of time;

a second polarizer that combines the first pulse from the first optical path with the second pulse from the second optical path at a location beyond the optical delay line to create the double pulse waveform wherein the first and second pulselets have orthogonal polarization.

22. A method for determining a range and velocity of a distant object, the method comprising the steps of:

(a) creating a doublet pulse waveform of coherent light, wherein the doublet pulse waveform comprises two pulses;

(b) directing the double pulse waveform toward the distant object;

(c) receiving a reflected doublet pulse waveform returned from the distant object;

(d) detecting the reflected doublet pulse waveform;

(e) measuring a time delay between the doublet pulse waveform and the reflected doublet pulse waveform wherein the time delay defines the range of the distant object;

(f) measuring a phase difference between first and second pulses in the reflected doublet pulse waveform, and determining the velocity of the distant object from the phase difference.

23. The method of claim 22 wherein step (a) further comprises the steps of:

(a1) q-switching the laser; and (a2) detecting a power level within the laser;

(a3) dumping a cavity within the laser to produce a first pulse of the doublet pulse waveform upon reaching a predetermined power level; and (a4) dumping the cavity a second time after a predetermined delay to produce the second pulse of the doublet pulse waveform.

24. The method of claim 22 wherein step (a) further comprises the step of:

(a1) q-switching the laser twice to create the first and second pulses of the doublet pulse waveform.

25. The method of claim 22 wherein step (a) further comprises the step of:

(a1) injection seeding to create the doublet pulse waveform.

26. The method of claim 22 wherein step (a) further comprises the step of:
   (a1) creating more than two pulses.

27. The method of claim 26 wherein step (a1) further comprises the step of:
   (a1A) creating the more than two pulses by repetitive q-switching.

28. The method of claim 26 wherein step (a1) further comprises the steps of:
   (a1A) determining a plurality of phase differences, one difference between a monitor signal of each of the more than two pulses created, and a return signal corresponding to each of the more than two pulses created;
   (a1B) accumulating a plurality of phase errors between a phase difference of a first of the more that two pulses created, and a phase difference of each of the more that two pulses created after the first of the more than two pulses created, wherein each phase difference is modified by a time difference between the transmission of the pulse and one of a set of predicted velocities, to create a plurality of phase error values, one phase error value for each combination of a phase difference of one of the more that two pulses and one of the set of predicted velocities;
   (a1C) accumulating the phase error values for each one of the set of predicted velocities to create accumulated phase error values; and
   (a1D) selecting the velocity as the predicted velocity of the accumulated phase error value that is a minimum of the phase error values.

29. The method of claim 28 wherein the step (a1a) further comprises the steps of:
   (a1A1) determining the phase difference between a monitor signal of each pulselet after the first of the more than two pulselets created, and a return signal corresponding to each pulselet after the first of the more than two pulselets created, by altering the phase difference by the time difference between the pulselet being altered and the first pulselet and further altering the phase difference by a hypothesized target velocity.

30. The method of claim 22 wherein step (a) further comprises the step of:
   (a1) creating a second of the two pulses with a polarization state orthogonal to a polarization state of a first of the two pulses.

31. The method of claim 30 wherein step (a1) comprises the steps of:
   (a1A) splitting a pulse created by the laser into first and second pulses and directing the first into a first optical path and directing the second pulse into a second optical path;
   (a1B) delaying the first pulse in the first optical path a predetermined amount of time;
   (a1C) combining the first pulse in the first optical path with the second pulse in the second optical path after the delaying to create the double pulse waveform wherein the first and second pulselet have orthogonal polarization.

32. The method of claim 22 wherein step (f) further comprises the steps of: (f1) creating a transmit phase map of the transmitted pulses; (f2) creating a receive phase map of the received pulses; and (f3) creating a conjugate product of the transmit phase map and the receive phase map to determine the velocity.

* * * * *